(12) United States Patent
Ohkawa et al.

(10) Patent No.: US 8,104,910 B2
(45) Date of Patent: Jan. 31, 2012

(54) LIGHT EMITTING DEVICE, SURFACE LIGHT SOURCE DEVICE, AND IMAGE DISPLAY DEVICE

(75) Inventors: Shingo Ohkawa, Saitama (JP); Takashi Oku, Kanagawa (JP); Kenichi Nakaki, Tokyo (JP); Tetsuo Shibanuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 312 days.

(21) Appl. No.: 12/133,527

(22) Filed: Jun. 5, 2008

(65) Prior Publication Data

US 2008/0304265 A1 Dec. 11, 2008

(30) Foreign Application Priority Data

Jun. 6, 2007 (JP) .................................. 2007-150822

(51) Int. Cl.
*G09F 13/08* (2006.01)
(52) U.S. Cl. .................. 362/97.3; 362/97.4; 362/249.02
(58) Field of Classification Search ........ 362/97.1–97.4, 362/227, 235, 236, 237, 244, 246, 249.01, 362/249.02, 326, 330, 335, 336, 800, 812; 349/57, 62, 64, 95, 98
See application file for complete search history.

(56) References Cited

U.S. PATENT DOCUMENTS

| | | | | |
|---|---|---|---|---|
| 5,598,281 A * | 1/1997 | Zimmerman et al. | ............. | 349/5 |
| 5,870,224 A * | 2/1999 | Saitoh et al. | ................... | 359/456 |
| 6,421,103 B2 * | 7/2002 | Yamaguchi | ..................... | 349/61 |
| 6,633,351 B2 * | 10/2003 | Hira et al. | ........................ | 349/95 |
| 6,876,408 B2 * | 4/2005 | Yamaguchi | ..................... | 349/57 |
| 7,396,150 B2 * | 7/2008 | Ogawa et al. | .................. | 362/607 |
| 7,455,416 B2 * | 11/2008 | Chen | ................................. | 362/85 |
| 7,579,629 B2 * | 8/2009 | Inoguchi | .......................... | 257/98 |
| 7,585,083 B2 * | 9/2009 | Kim et al. | ..................... | 362/97.3 |
| 7,635,200 B2 * | 12/2009 | Atsushi | ......................... | 362/244 |
| 7,679,828 B2 * | 3/2010 | Munro | ......................... | 359/627 |
| 7,703,973 B2 * | 4/2010 | Zhu et al. | ...................... | 362/623 |
| 2005/0117347 A1 * | 6/2005 | Melpignano et al. | ......... | 362/309 |
| 2006/0027828 A1 * | 2/2006 | Kikuchi | .......................... | 257/99 |
| 2006/0291185 A1 * | 12/2006 | Atsushi | ........................... | 362/29 |

FOREIGN PATENT DOCUMENTS

| | | |
|---|---|---|
| JP | 10-082915 | 3/1998 |
| JP | 2006-032172 | 2/2006 |
| JP | 2006-236951 | 9/2006 |

OTHER PUBLICATIONS

Japanese Office Action issued on Jun. 23, 2011, in connection with counterpart JP Application No. 2007-150822.

* cited by examiner

*Primary Examiner* — Hargobind S Sawhney
(74) *Attorney, Agent, or Firm* — SNR Denton US LLP

(57) ABSTRACT

A light emitting device includes a plurality of light emitting diodes, a plurality of sealing resins, and a lens body formed in substantially a shape of a flat plate for guiding the light. The lens body is also disposed in a state of extending over the disposition surface of each sealing resin. The lens body includes a plurality of lens parts and a plurality of light guiding parts for reflecting the light by inside surfaces of the light guiding parts. The plurality of lens parts and the plurality of light guiding parts of the lens body are formed integrally with each other. The lens parts are disposed on the respective disposition surfaces of the sealing resins, and a plurality of light emitting function parts for sending out the light reflected by the inside surfaces of the light guiding parts are formed in the light guiding parts.

18 Claims, 11 Drawing Sheets

LIGHT EMITTING DEVICE, SURFACE LIGHT SOURCE DEVICE, AND IMAGE DISPLAY DEVICE

CROSS REFERENCES TO RELATED APPLICATIONS

The present invention contains subject matter related to Japanese Patent Application JP 2007-150822 filed in the Japan Patent Office on Jun. 6, 2007, the entire contents of which being incorporated herein by reference.

BACKGROUND OF THE INVENTION

1. Field of the Invention

The present invention relates to a technical field of a light emitting device, a surface light source device, and an image display device, and particularly to a technical field in which reduced thickness is achieved by providing a lens body obtained by forming lens parts and light guiding parts integrally with each other, and uniformity of luminance is achieved.

2. Description of the Related Art

There is a lighting device that performs lighting using a plurality of light emitting devices having a light emitting diode as a light source.

Such a lighting device is, for example, used as lighting equipment using a light source for direct lighting or used in an image display device such as a television receiver or the like using a light source for backlight lighting.

As an image display device such as a television receiver or the like, there is a so-called side edge type having a plurality of light emitting devices arranged on sides of a display panel.

An image display device needs to maintain uniformity of luminance of a display panel as a whole when light is emitted from a light emitting device. There is an image display device of the side edge type in related art in which in order to maintain uniformity of luminance, a plurality of light emitting devices are arranged on peripheral sides of a light guiding plate, and light emitted from the light emitting devices is guided to a necessary position by the light guiding plate and then sent out to a display panel (see Japanese Patent Laid-Open No. 2006-236951, for example).

SUMMARY OF THE INVENTION

In the image display device of the side edge type in the related art, however, because the plurality of light emitting devices are arranged on peripheral sides of the light guiding plate, an amount of light at a distant part on the display panel from the light emitting devices may become insufficient. It is therefore necessary to correspondingly increase the number of light emitting devices or use light emitting devices having high emission intensity, thus raising manufacturing cost.

In particular, there has recently been a tendency for display panels to be increased in size, and thus amounts of light tend to become insufficient.

Accordingly, the insufficiency of amounts of light can be eliminated by using an image display device of a so-called backlight type in which a plurality of light emitting devices are arranged directly under a display panel.

In the image display device of the backlight type, however, because the light emitting devices are arranged directly under the display panel, the luminance of a part corresponding to a light emitting device on the display panel may be higher than that of other parts, and thus luminance uniformity may be impaired. A measure therefore needs to be taken to prevent the inconvenience of impairment of luminance uniformity.

In addition, image display devices having reduced thickness have recently been in high demand. It is thus necessary to secure the reduced thickness and secure luminance uniformity.

It is accordingly desirable to provide a light emitting device, a surface light source device, and an image display device that can overcome the above-described problems and achieve reduced thickness and luminance uniformity.

According to an embodiment of the present invention, there are provided a light emitting device, a surface light source device, and an image display device including: a plurality of light emitting diodes for emitting light in a predetermined direction; a plurality of sealing resins sealing the light emitting diodes and having a disposition surface; and a lens body formed in substantially a shape of a flat plate for guiding the light emitted from the light emitting diodes in a predetermined direction, the lens body being disposed in a state of extending over the disposition surface of each sealing resin; wherein the lens body includes a plurality of lens parts for sending out the light emitted from the light emitting diodes and a plurality of light guiding parts for reflecting the light emitted from the light emitting diodes by inside surfaces of the light guiding parts, the plurality of lens parts and the plurality of light guiding parts of the lens body are formed integrally with each other, the lens parts are disposed on the respective disposition surfaces of the sealing resins, and a plurality of light emitting function parts for sending out the light reflected by the inside surfaces of the light guiding parts are formed in the light guiding parts.

Thus, the light emitting diode, the surface light source device, and the image display device according to the above-described embodiment of the present invention send out the light emitted from the light emitting diodes from the lens parts, and send out the light emitted from the light emitting diodes by the light emitting function parts after the light emitted from the light emitting diodes is reflected by the inside surfaces of the light guiding parts in the light guiding parts.

According to an embodiment of the present invention, there is provided a light emitting device including: a plurality of light emitting diodes for emitting light in a predetermined direction; a plurality of sealing resins sealing the light emitting diodes and having a disposition surface; and a lens body formed in substantially a shape of a flat plate for guiding the light emitted from the light emitting diodes in a predetermined direction, the lens body being disposed in a state of extending over the disposition surface of each sealing resin; wherein the lens body includes a plurality of lens parts for sending out the light emitted from the light emitting diodes and a plurality of light guiding parts for reflecting the light emitted from the light emitting diodes by inside surfaces of the light guiding parts, the plurality of lens parts and the plurality of light guiding parts of the lens body are formed integrally with each other, the lens parts are disposed on the respective disposition surfaces of the sealing resins, and a plurality of light emitting function parts for sending out the light reflected by the inside surfaces of the light guiding parts are formed in the light guiding parts.

Thus, because the light emitted from the light emitting diodes is sent out from the lens parts and the light guiding parts, luminance uniformity can be secured.

In addition, because the lens body having the lens parts and the light guiding parts is formed in substantially the shape of a flat plate, reduced thickness can be achieved.

Preferably, formation density of the light emitting function parts of the lens body becomes higher as distance from the lens parts is increased. There is thus no great difference between amounts of light emitted from the lens body at respective parts, so that luminance uniformity can be secured.

According to an embodiment of the present invention, there is provided a surface light source device including: a light emitting device having a plurality of light emitting diodes for emitting light in a predetermined direction and a plurality of sealing resins sealing the light emitting diodes and having a disposition surface; and a lens body formed in substantially a shape of a flat plate for guiding the light emitted from the light emitting diodes in a predetermined direction, the lens body being disposed in a state of extending over the disposition surface of each sealing resin; wherein the lens body includes a plurality of lens parts for sending out the light emitted from the light emitting diodes and a plurality of light guiding parts for reflecting the light emitted from the light emitting diodes by inside surfaces of the light guiding parts, the plurality of lens parts and the plurality of light guiding parts of the lens body are formed integrally with each other, the lens parts are disposed on the respective disposition surfaces of the sealing resins, and a plurality of light emitting function parts for sending out the light reflected by the inside surfaces of the light guiding parts are formed in the light guiding parts.

Thus, because the light emitted from the light emitting diodes is sent out from the lens parts and the light guiding parts, luminance uniformity can be secured.

In addition, because the lens body having the lens parts and the light guiding parts is formed in substantially the shape of a flat plate, reduced thickness can be achieved.

According to an embodiment of the present invention, there is provided an image display device including: a display panel for displaying an image; and a surface light source device having a light emitting device for irradiating the display panel with light; wherein the light emitting device includes a plurality of light emitting diodes for emitting light in a predetermined direction, a plurality of sealing resins sealing the light emitting diodes and having a disposition surface, and a lens body formed in substantially a shape of a flat plate for guiding the light emitted from the light emitting diodes in a predetermined direction, the lens body being disposed in a state of extending over the disposition surface of each sealing resin, the lens body includes a plurality of lens parts for sending out the light emitted from the light emitting diodes and a plurality of light guiding parts for reflecting the light emitted from the light emitting diodes by inside surfaces of the light guiding parts, the plurality of lens parts and the plurality of light guiding parts of the lens body are formed integrally with each other, the lens parts are disposed on the respective disposition surfaces of the sealing resins, and a plurality of light emitting function parts for sending out the light reflected by the inside surfaces of the light guiding parts are formed in the light guiding parts.

Thus, because the light emitted from the light emitting diodes is sent out from the lens parts and the light guiding parts, luminance uniformity can be secured.

In addition, because the lens body having the lens parts and the light guiding parts is formed in substantially the shape of a flat plate, reduced thickness can be achieved.

DETAILED DESCRIPTION OF THE PREFERRED EMBODIMENTS

The best mode of a light emitting device, a surface light source device, and an image display device according to the present invention will hereinafter be described with reference to the accompanying drawings.

In the best mode illustrated below, an image display device according to an embodiment of the present invention is applied to a television receiver for displaying an image on a liquid crystal panel, a surface light source device according to an embodiment of the present invention is applied to a surface light source device used in the television receiver, and a light emitting device according to an embodiment of the present invention is applied to a light emitting device used in the surface light source device.

It is to be noted that the scope of application of the present invention is not limited to the television receiver having the liquid crystal panel, and the surface light source device and the light emitting device used in the television receiver, and that the present invention is applicable to various other television receivers, image display devices used in personal computers, and the like, and various surface light source devices and light emitting devices used in the various other television receivers, the image display devices, and the like.

Figure 1:
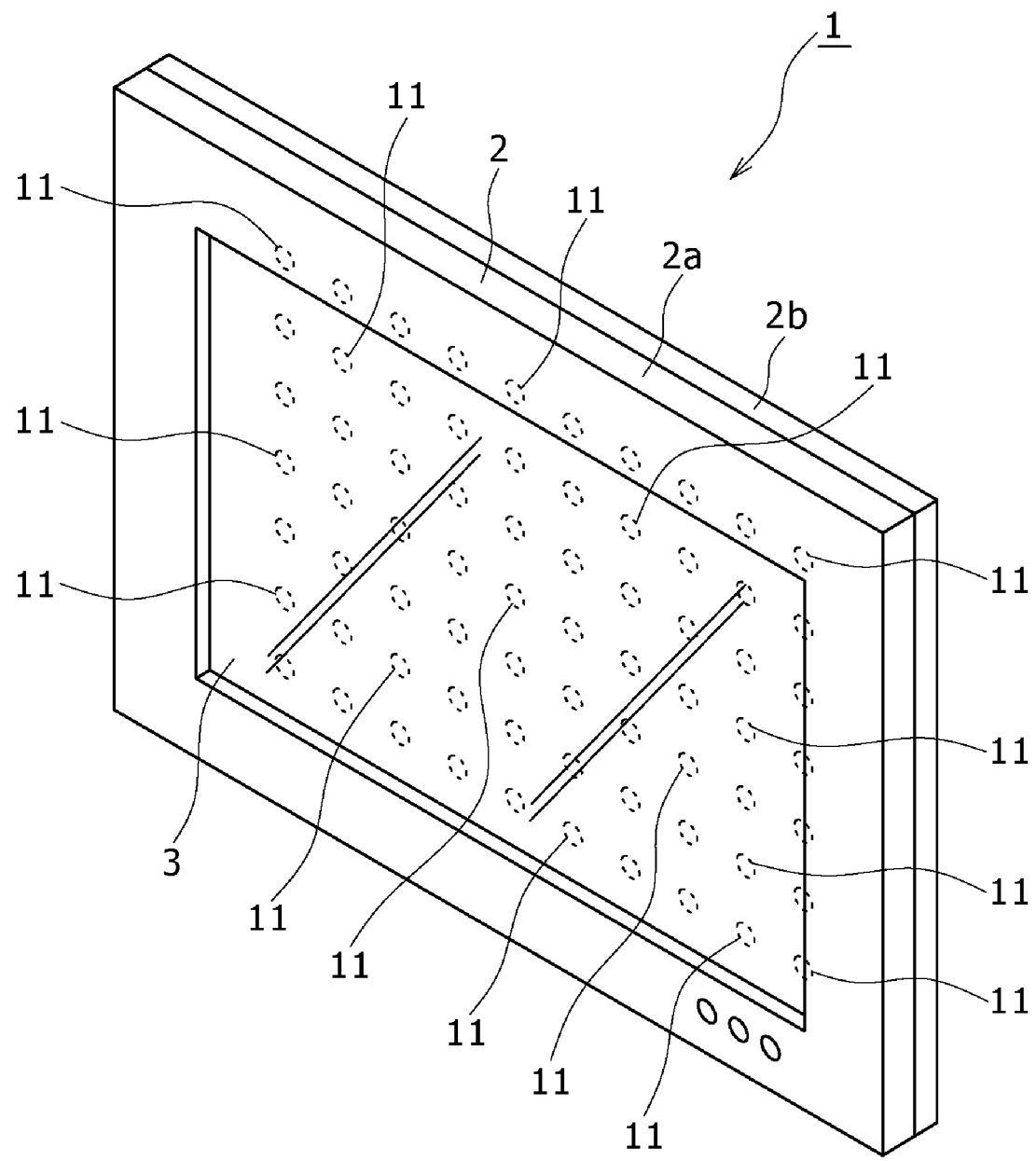
FIG. 1 shows the best mode for carrying out the present invention together with FIGS. 2 to 11, FIG. 1 being a schematic perspective view of an image display device.
Figure 2:
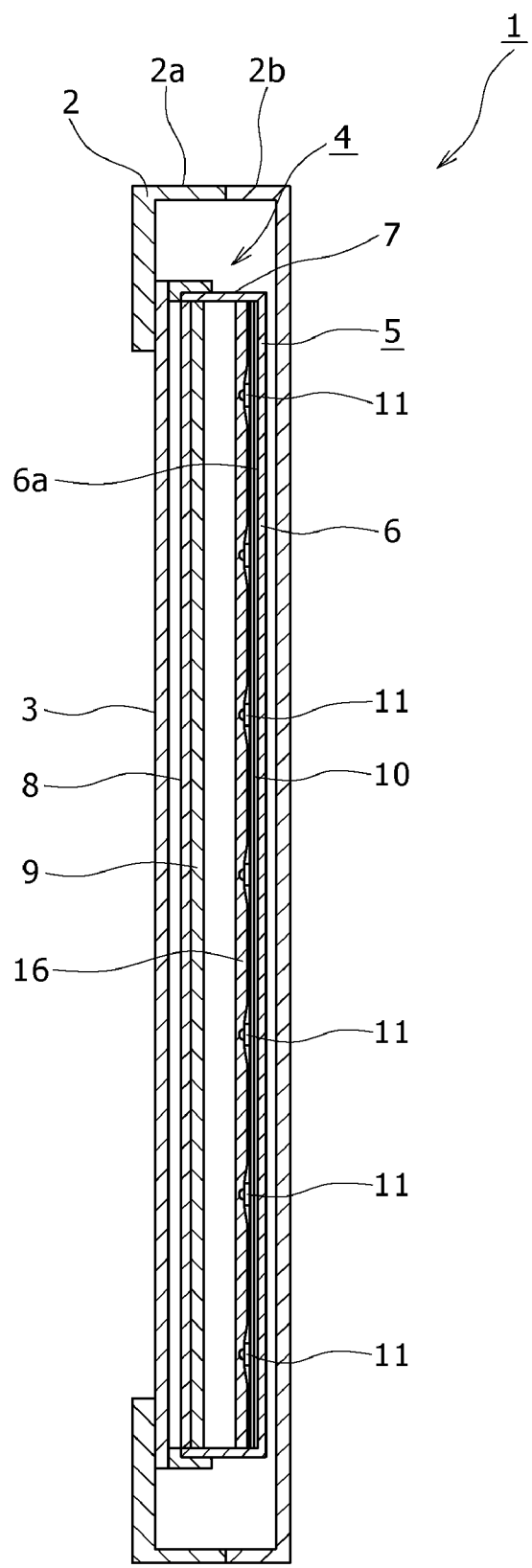
FIG. 2 is a schematic vertical sectional view of the image display device.

An image display device (television receiver) 1 is formed by arranging necessary parts within an outer casing 2 (see FIG. 1 and FIG. 2). The outer casing 2 is formed by joining together a front panel 2a and a rear panel 2b.

An opening penetrating the front panel 2a of the outer casing 2 from the front to the rear of the front panel 2a is formed, and a display panel 3 for displaying an image is disposed at a position where the opening is closed from the inside. The display panel 3 is, for example, formed by sandwiching a transmissive type color liquid crystal panel between two polarizers from the front and the rear. The display panel 3 displays full-color video by being driven by an active matrix.

A surface light source device 4 is disposed within the outer casing 2 (see FIG. 2). The surface light source device 4 is formed by arranging necessary parts in a casing 5.

The casing 5 is formed by a metallic material having high thermal conductivity or the like in the shape of a box that is flat in a front-to-rear direction and which box is opened frontward. The casing 5 includes a disposition surface part 6 facing in the front-to-rear direction and a peripheral part 7 projecting frontward from the peripheral edge of the disposition surface part 6.

An optical sheet 8 and a diffuser 9 are attached to the front end part of the casing 5.

The optical sheet 8 is, for example, formed by arranging various sheets having predetermined optical functions such as a prism sheet for refracting light emitted from a light source (light emitting diode) to be described later and guiding the light in a predetermined direction, a polarization direction converting sheet for converting a direction of polarization, and the like in the form of layers.

The optical sheet 8 is attached to the front surface of the diffuser 9. The diffuser 9 is disposed in such a manner as to be opposed to the light source. The diffuser 9 has a function of diffusing the light emitted from the light source within the casing 5 and thereby reducing variations in luminance of the display panel 3.

A circuit board 10 is disposed on one surface of the disposition surface part 6 of the casing 5, that is, a front surface 6a. The circuit board 10 has a plurality of light emitting devices 11 arranged thereon in the form of a matrix in a state of being positioned at equal intervals vertically and horizontally (see FIGS. 1 to 3).

The light emitting devices 11, for example, emit white light. Incidentally, the light emitting devices 11 are not limited to devices that emit white light, but may be devices that emit red, blue, and green light. For example, a plurality of light emitting units each including a light emitting device emitting red light, a light emitting device emitting blue light, and two light emitting devices emitting green light may be arranged in the form of a matrix. The number of light emitting devices 11 and the colors of the emitted light are arbitrary.

Figure 4:
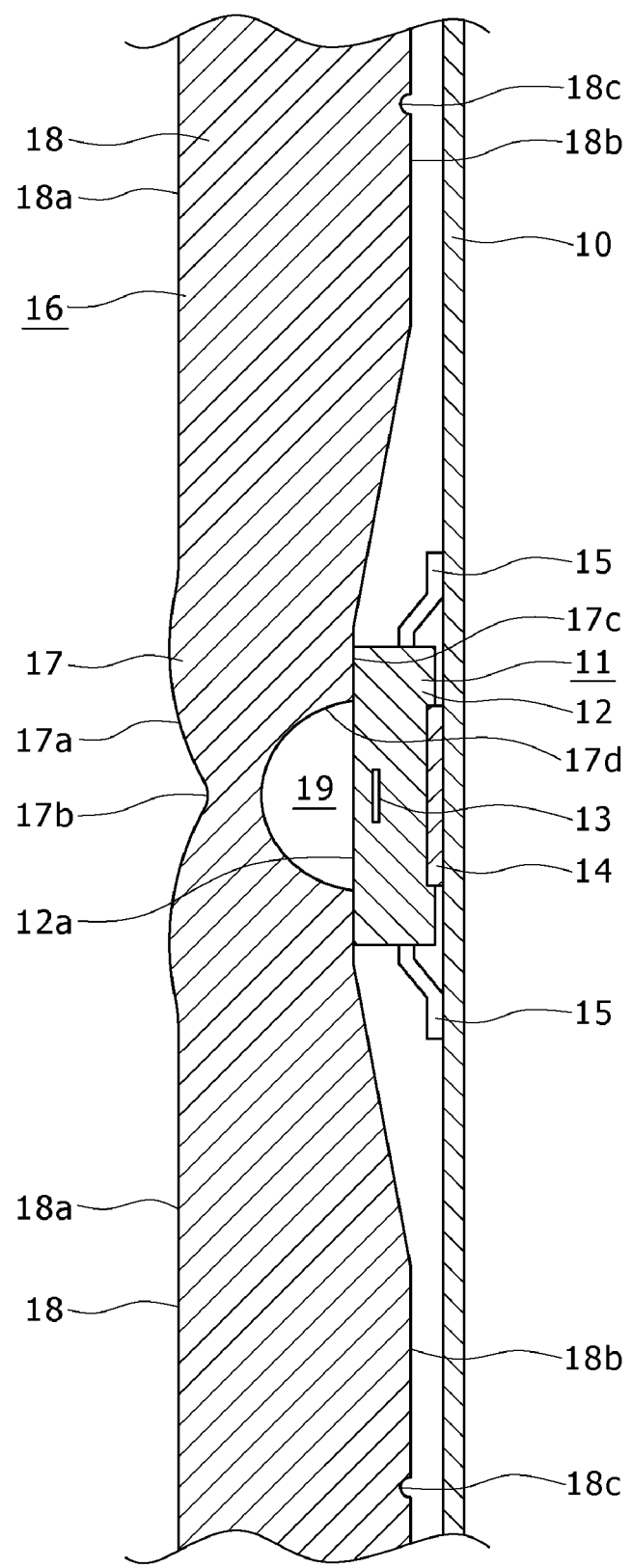
FIG. 4 is an enlarged sectional view of the lens body and a light emitting device.

The light emitting devices 11 have a sealing resin 12 and a light emitting diode 13 functioning as the light source of the backlight (see FIG. 4).

The sealing resin 12 is formed in substantially the shape of a block. The front surface of the sealing resin 12 is formed as a disposition surface 12a. A radiator plate 14 is attached to the rear surface part of the sealing resin 12. The radiator plate 14 has a function of radiating heat generated during the driving of the light emitting diode 13.

The light emitting diode 13 is disposed in a state of being buried in the sealing resin 12. A pair of connecting terminals 15 and 15 is connected to the light emitting diode 13. A part of the connecting terminals 15 and 15 project sideways from the sealing resin 12.

Figure 5:
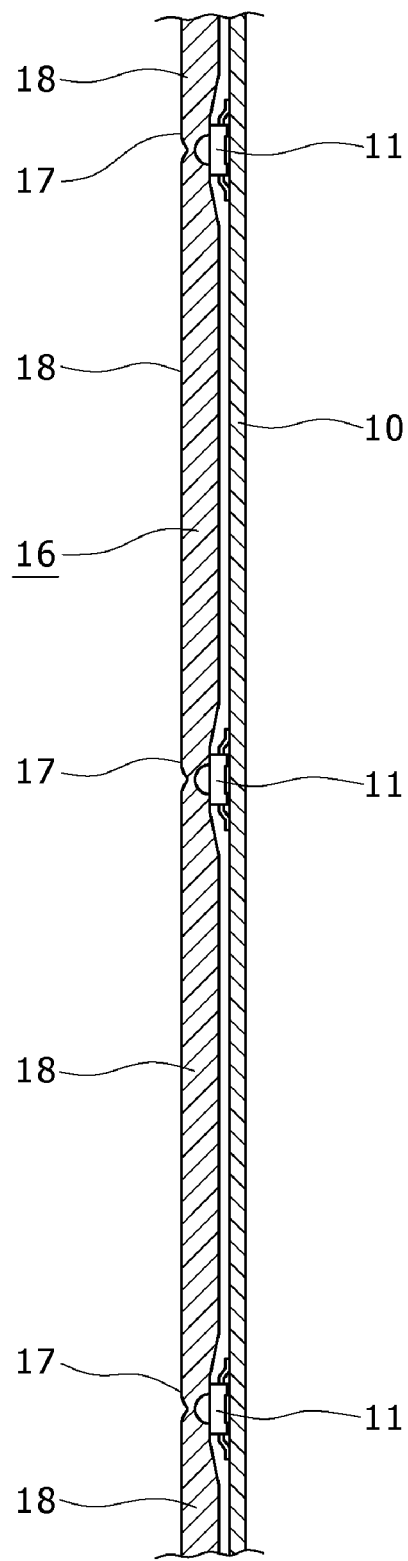
FIG. 5 is a sectional view of the lens body and a plurality of light emitting devices.

A lens body 16 is disposed in a state of extending over the disposition surfaces 12a of the sealing resins 12 of the light emitting devices 11 (see FIG. 5).

The lens body 16 is formed in substantially the shape of a flat plate by a transparent resin material such as polycarbonate or the like. As shown in FIG. 4 and FIG. 5, the lens body 16 is made by integrally forming lens parts 17 formed in a circular shape as viewed in a direction of the optical axis of light emitted from the light emitting diode 13 and light guiding parts 18 provided between the lens parts 17. As shown in FIG. 4, the lens parts 17 of the lens body 16 are disposed over the disposition surfaces 12a of the sealing resins 12 respectively.

The front surface of the lens part 17 is formed in the shape of a curved surface that is convex frontward. This front surface is formed as a light emitting surface 17a. A concave part 17b depressed rearward is formed at the central part of the light emitting surface 17a. The rear surface of the lens part 17 is an attached surface 17c formed in the shape of a flat surface.

A concave-shaped part 17d in the form of a hemisphere opened rearward is formed on the attached surface 17c side of the lens part 17.

The light guiding parts 18 are provided in such a manner as to be continuous with the sides of the lens parts 17. The light guiding part 18 has a front surface 18a formed in the shape of a flat surface, and has a rear surface 18b in which a plurality of light emitting function parts 18c are formed (see FIG. 6 and FIG. 7). The light emitting function parts 18c have a function of sending out light emitted from the light emitting diode 13 from the front surface 18a. A grain formed by microfabrication, for example, is used as the light emitting function parts 18c.

Figure 6:
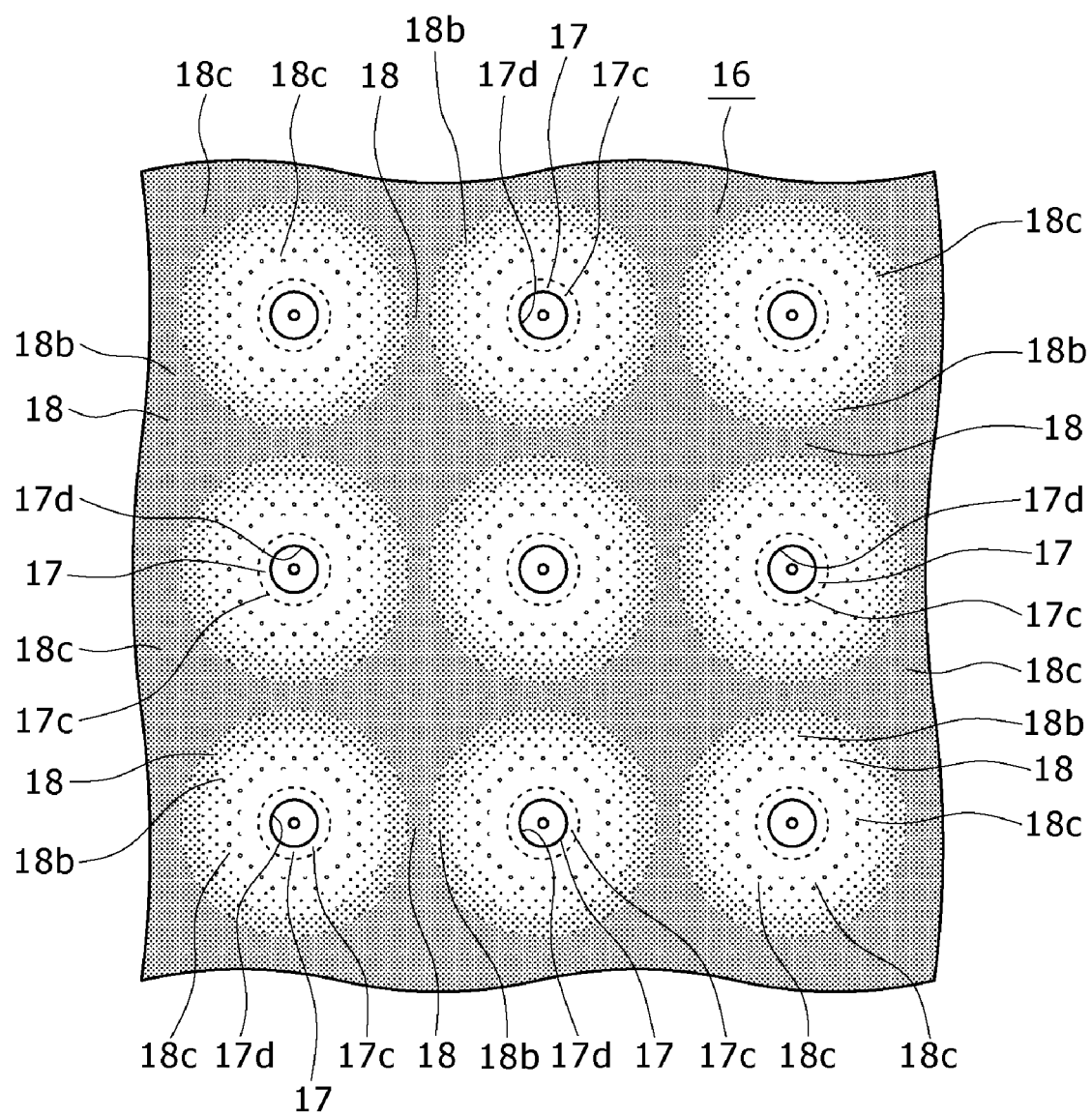
FIG. 6 is a rear view of the lens body.

As shown in FIG. 6, the formation density of the light emitting function parts 18c is increased as the light emitting function parts 18c become more distant from the lens part 17. For example, no light emitting function parts 18c are formed in an end part of the light guiding part 18 on the lens part 17 side, the formation density is low in a part of the light guiding part 18 which part is slightly distant from the lens part 17, and the formation density is highest in a part of the light guiding part 18 which part is distant from the lens part 17.

The lens body 16 is disposed with the attached surface 17c in contact with the disposition surface 12a of the sealing resin 12. The lens body 16 is provided with a plurality of caulking pins not shown in the figure that are projected rearward from the attached surfaces 17c. These caulking pins are inserted into the sealing resins 12 and then caulked, whereby the lens body 16 is fixed to the sealing resins 12.

The concave-shaped part 17d of the lens part 17 is a closed space in a state in which the lens body 16 is fixed to the sealing resins 12. This closed space forms an air layer 19.

End parts of the connecting terminals 15 and 15 of the light emitting device 11 formed as described above are each connected to the circuit pattern of the circuit board 10, which circuit pattern is not shown in the figure. At this time, the radiator plate 14 is disposed in contact with the heat conducting part of the circuit board 10, the heat conducting part not shown in the figure.

Figure 7:
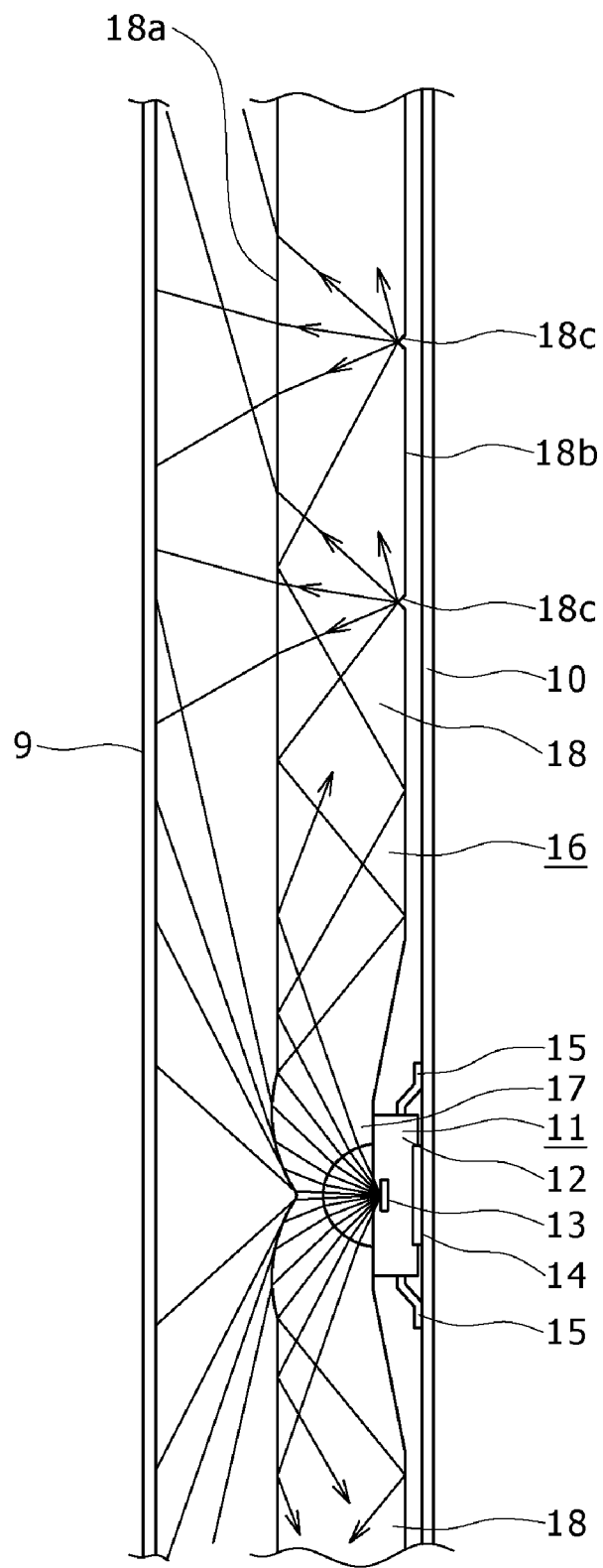
FIG. 7 is a conceptual diagram showing paths of light emitted from a light emitting diode.

In the light emitting device 11, when light is emitted from the light emitting diode 13, as shown in FIG. 7, the emitted light goes toward the light emitting surface 17a of the lens part 17 or the front surface 18a of the light guiding part 18 in the lens body 16 at predetermined emission angles. At this time, light at emission angles other than zero degrees is refracted in directions of going sideways at an interface between the sealing resin 12 and the air layer 19, is further refracted in directions of going sideways at an interface between the air layer 19 and the lens part 17, and then reaches the light emitting surface 17a or the front surface 18a.

The light that has reached the light emitting surface 17a of the lens part 17 is transmitted and emitted from the light emitting surface 17a.

On the other hand, the light that has reached the front surface 18a of the light guiding part 18 is reflected a plurality of times by the refractive medium of the lens body 16, such as between the front surface 18a and the rear surface 18b of the light guiding part 18. The light reflected by the inside surfaces is guided in a direction of being separated from the lens part 17 within the light guiding part 18, diffused by the light emitting function parts 18c and then emitted from the front surface 18a.

At this time, the light emitted from the light emitting diode 13 is attenuated as the light is guided to a distant position. However, as described above, the formation density of the light emitting function parts 18c is increased as the light emitting function parts 18c become more distant from the lens part 17. There is thus no great difference between amounts of light emitted from the front surface 18a at respective parts of the front surface 18a.

As described above, the light emitting device 11 has the air layer 19 between the lens body 16 and the sealing resin 12 which air layer transmits the light emitted from the light emitting diode 13. Therefore the light is refracted in directions of going sideways at the interface between the sealing resin 12 and the air layer 19 and the interface between the air layer 19 and the lens part 17. Amounts of light emitted sideways can thus be increased.

The light emitted from the light emitting surface 17a and the front surface 18a of the lens body 16 passes through the diffuser 9 and the optical sheet 8, and then reaches the display panel 3. The light emitted from the light emitting diode 13 is thus sent out from the light emitting surface 17a or the front surface 18a to the diffuser 9. The amounts of light reaching the diffuser 9 are substantially equal to each other throughout the diffuser 9.

Figure 8:
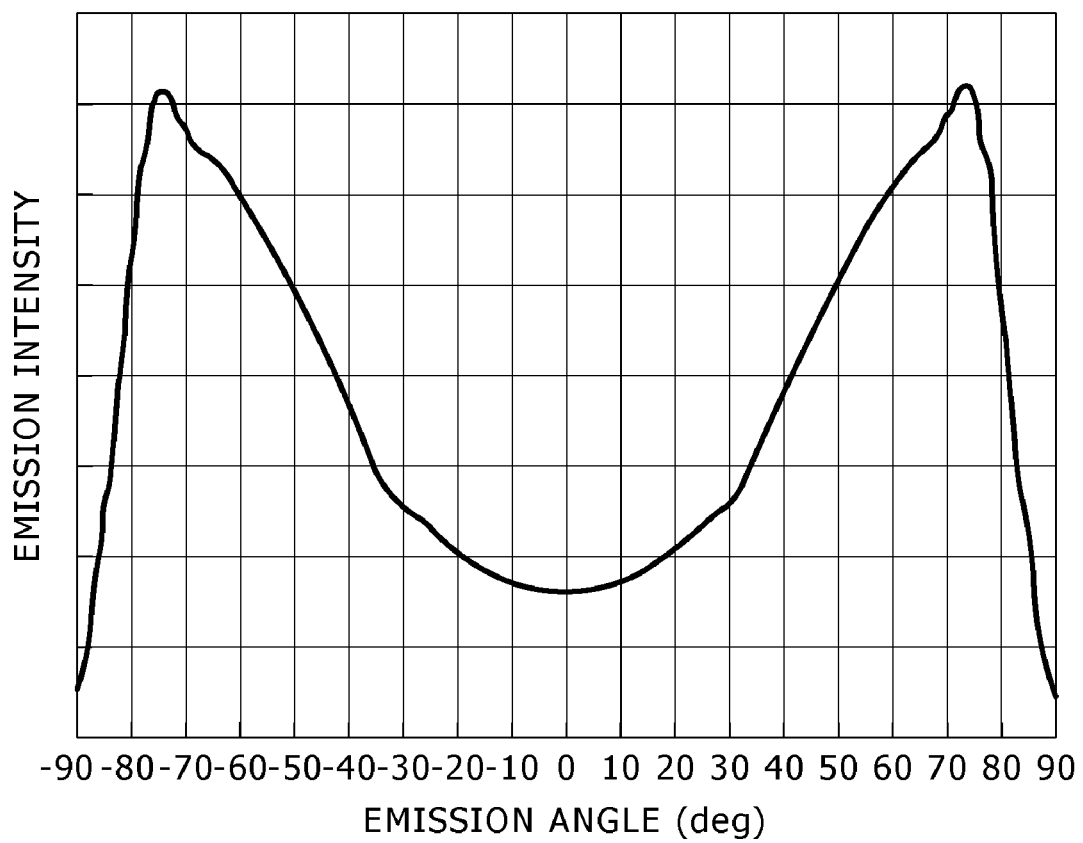
FIG. 8 is a graphic representation of relation between the emission angle and the emission intensity of a light emitting device by comparison.
Figure 8:
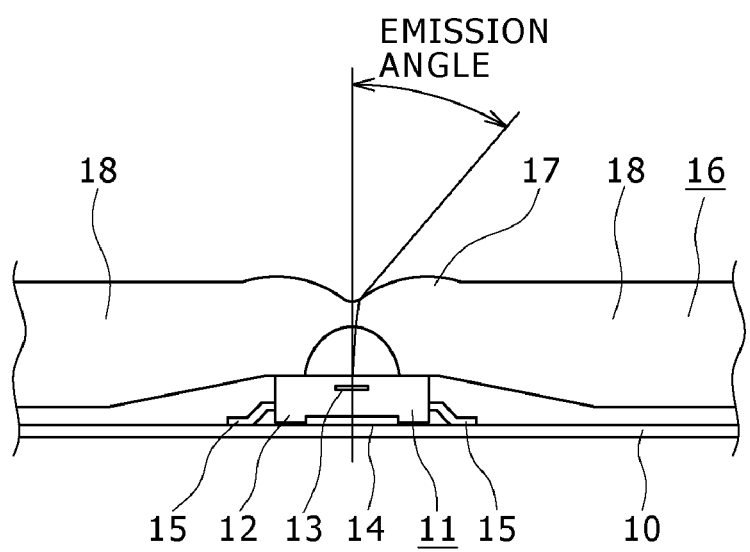

FIG. 8 is a diagram showing relation between the emission angle and the emission intensity of the light emitting device 11. The emission angle is an angle with respect to the optical axis of the light emitted from the lens part 17. An emission angle of zero degrees in FIG. 8 is the angle of light emitted in the direction of the optical axis. The emission intensity exhibits a minimum value at an emission angle of zero degrees, and exhibits a maximum value in the vicinity of emission angles of ±75 degrees.

Figure 3:
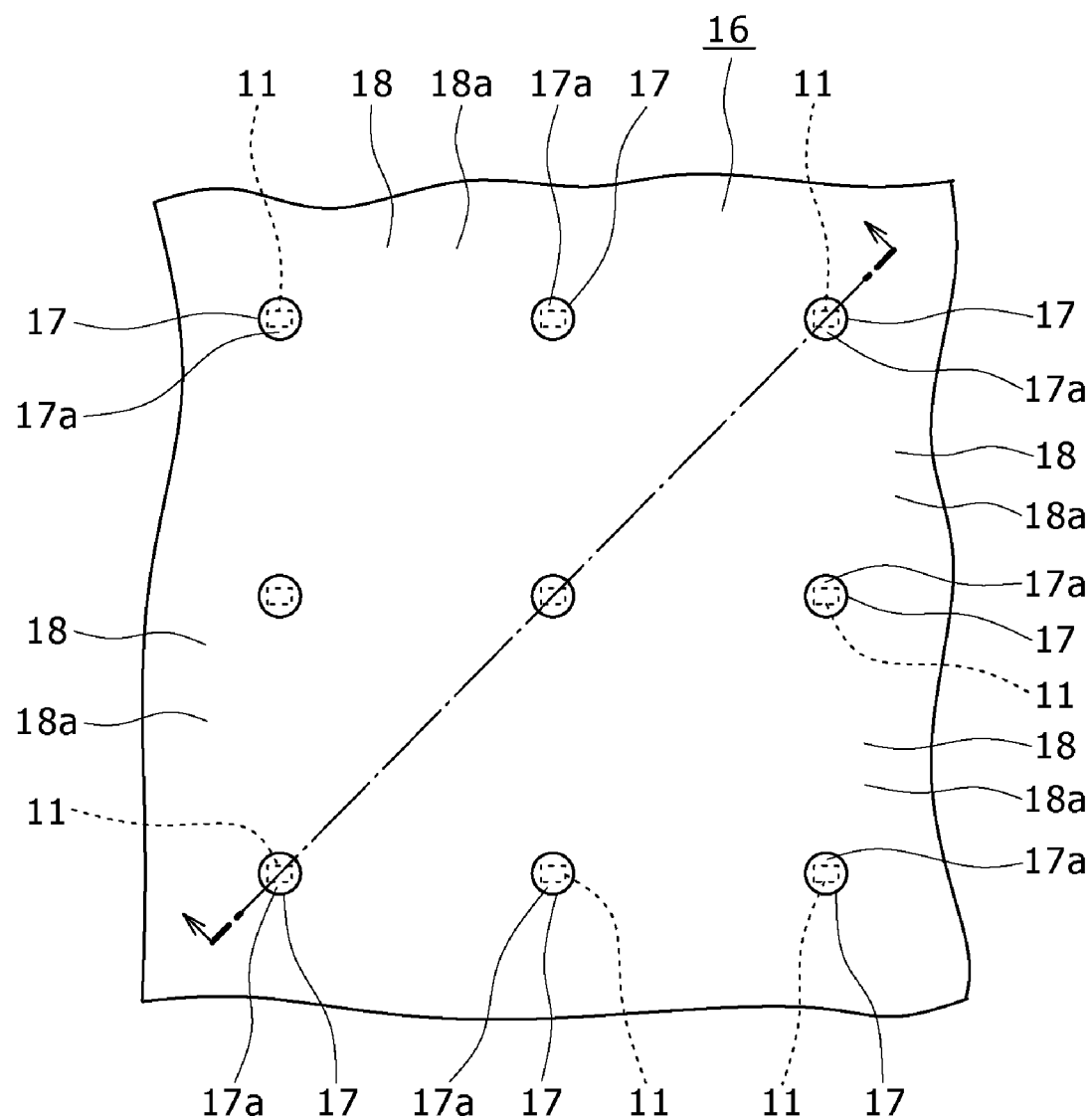
FIG. 3 is a front view showing positional relation between a lens body and light emitting devices.
Figure 9:
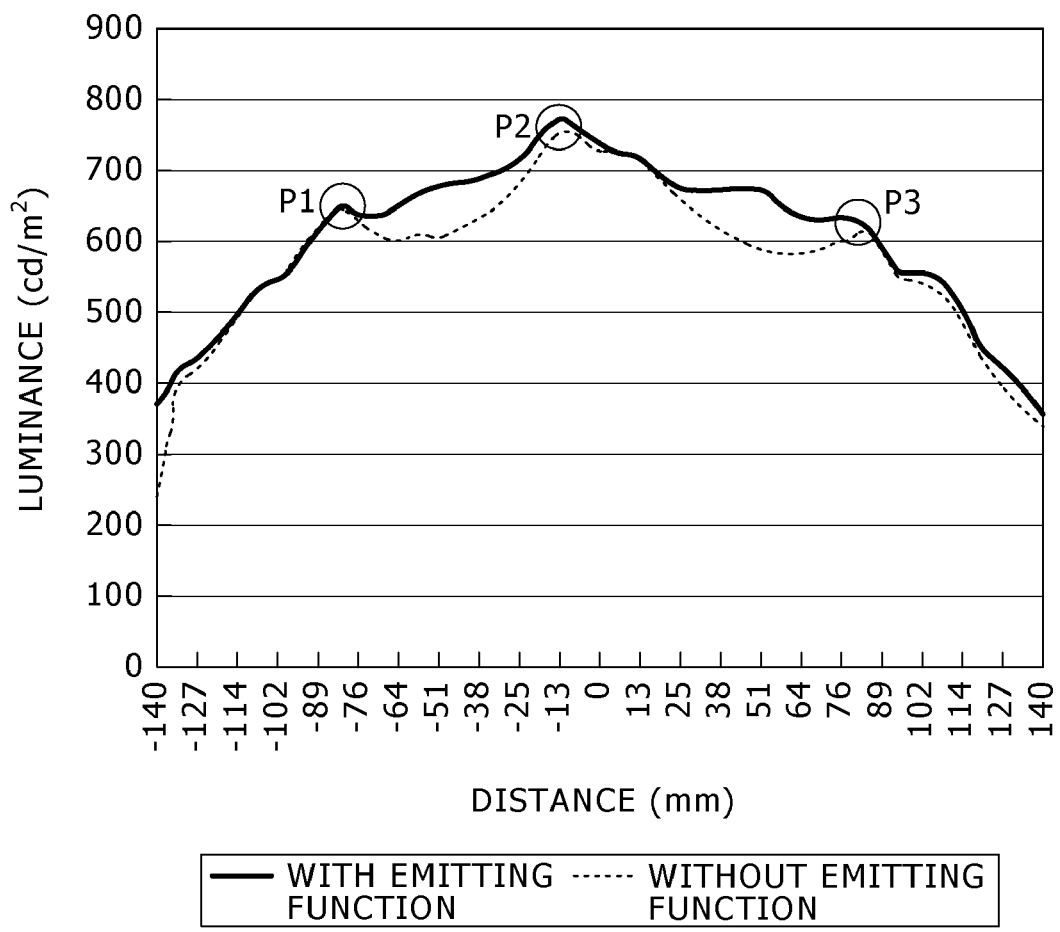
FIG. 9 is a graphic representation of relation between distance from a light emitting diode and the distribution of luminance of light emitting devices by comparison.

FIG. 9 is a diagram showing relation between distance (distance in a direction orthogonal to the optical axis) from a light emitting diode of the light emitting devices 11 set at the emission intensity shown in FIG. 8 and the distribution of luminance on the optical sheet at positions along an indication line in FIG. 3. A solid line represents the distribution of luminance on the lens body 16 having the light emitting function parts 18c. A broken line represents the distribution of luminance on a lens body without light emitting function parts.

Maximum values P1, P2, and P3 shown in FIG. 9 are luminance directly above light emitting diodes 13, 13, and 13, respectively (on the optical axes). The luminance in the case where the light emitting function parts 18c are provided and the luminance in the case where the light emitting function parts 18c are not provided exhibit substantially same values. However, the uniformity of the luminance in the case where the light emitting function parts 18c are provided is enhanced as compared with the case where the light emitting function parts 18c are not provided.

Incidentally, as shown in FIG. 9, the distribution of luminance directly above the light emitting devices 11 and 11 corresponding to the maximum values P1 and P3 is lower than the distribution of luminance directly above the light emitting device 11 corresponding to the maximum value P2. This is because the distribution of luminance directly above the light emitting device 11 corresponding to the maximum value P2 is greatly affected by the light emitted from the two light emitting devices 11 and 11 corresponding to the adjacent maximum values P1 and P3 on both sides, whereas the distribution of luminance directly above the light emitting devices 11 and 11 corresponding to the maximum values P1 and P3 is greatly affected by the light emitted from only one light emitting device 11 corresponding to the maximum value P2.

In addition, as shown in FIG. 9, the luminance is lowered as the position is shifted from the maximum values P1 and P3 to a side opposite from the maximum value P2. This is because there is no light emitting device 11 at positions on the opposite sides of the light emitting devices 11 and 11 corresponding to the maximum values P1 and P3 from the light emitting device 11 corresponding to the maximum value P2.

In the above description, an example in which the light emitting function parts 18c are formed in the rear surface 18b of the lens body 16 has been illustrated. Conversely, the light emitting function parts 18c may be formed in the front surface 18a of the lens body 16, or the light emitting function parts 18c may be formed in both the front surface 18a and the rear surface 18b of the lens body 16.

Figure 10:
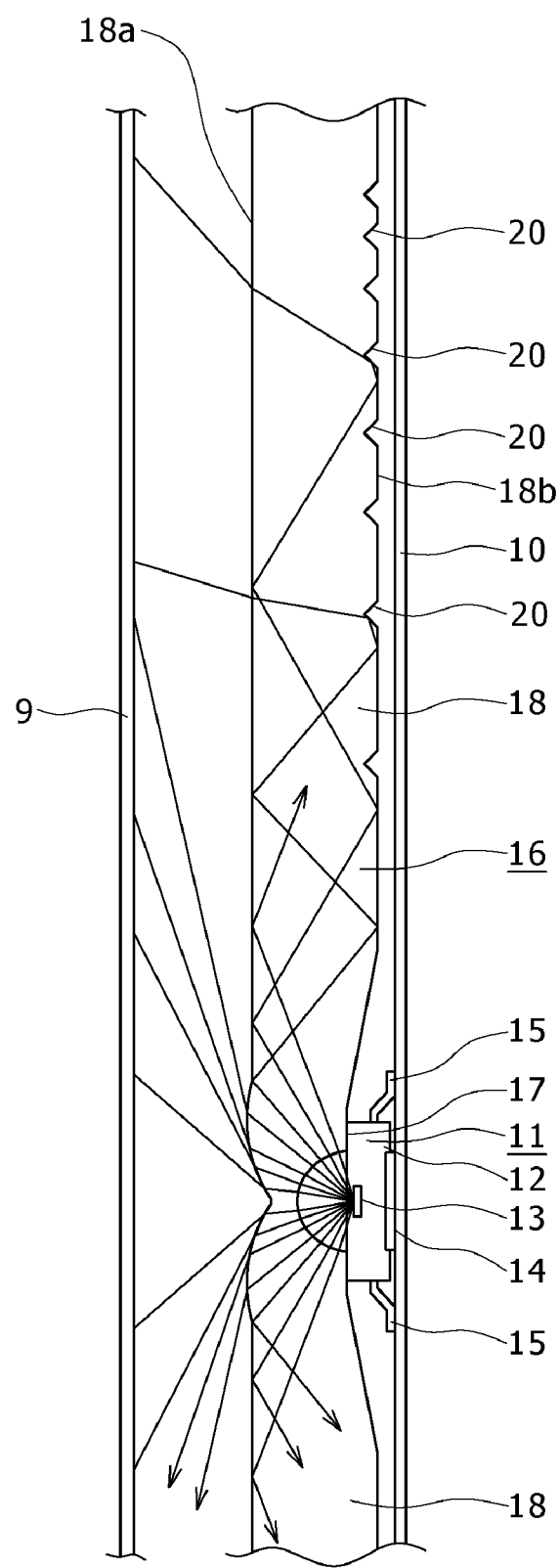
FIG. 10 is a sectional view of an example in which groove parts are used as light emitting function parts.

In addition, while in the above description, an example in which a grain formed by microfabrication is used as the light emitting function parts 18c has been illustrated, the light emitting function parts 18c are not limited to the grains. For example, as shown in FIG. 10, groove parts 20 can be formed in the shape of concentric circles in the rear surface 18b of the lens body 16, and the groove parts 20 can be used as the light emitting function parts 18c.

Figure 11:
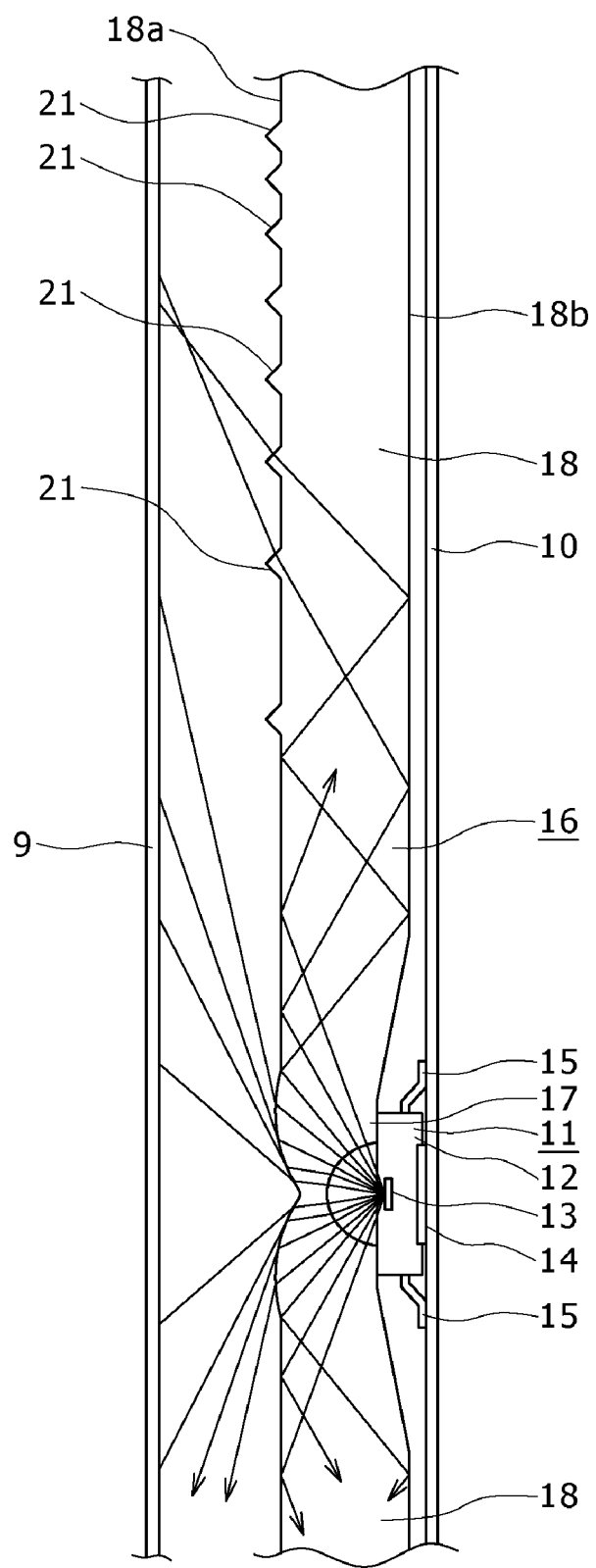
FIG. 11 is a sectional view of an example in which projection parts are used as light emitting function parts.

In addition, as shown in FIG. 11, for example, projection parts 21 can be formed in the shape of concentric circles in the front surface 18a of the lens body 16, and the projection parts 21 can be used as the light emitting function parts 18c.

Further, for example, the light emitting function parts 18c can be formed by forming a dot pattern by printing or spraying the rear surface 18b of the lens body 16 with a metallic material or the like by blasting.

As described above, the image display device 1 is provided with the lens body 16, and light emitted from the light emitting diode 13 is sent out from the lens parts 17 and the light guiding parts 18 to the display panel 3. It is therefore possible to secure the uniformity of luminance on the display panel 3, and prevent variations in luminance on the display panel 3.

In addition, because the lens body 16 having the lens parts 17 and the light guiding parts 18 is formed in substantially the shape of a flat plate, the image display device 1 can be reduced in thickness.

Further, because the lens body 16 is made by forming the lens parts 17 and the light guiding parts 18 integrally with each other, it is possible to reduce the number of parts and manufacturing cost.

Incidentally, while in the above description, an example in which the light emitting device 11 has the air layer 19 formed to refract light at interfaces has been illustrated, it is also possible to form the lens body 16 without the concave-shaped part 17d so that the air layer 19 is not present. When the air layer is not formed on the light emitting device, the lens body is reduced in thickness by an amount corresponding to the removed air layer 19, and thus the image display device 1 can be further reduced in thickness.

The concrete shapes and structures of respective parts illustrated in the above-described best mode are each a mere example of embodiment in carrying out the present invention, and the technical scope of the present invention is not to be construed in a restricted manner by these concrete shapes and structures.

It should be understood by those skilled in the art that various modifications, combinations, sub-combinations and alterations may occur depending on design requirements and other factors insofar as they are within the scope of the appended claims or the equivalents thereof.

What is claimed is:

1. A light emitting device comprising:
   a plurality of light emitting diodes for emitting light in a predetermined direction;
   a plurality of sealing resins sealing the light emitting diodes and having a disposition surface; and
   a lens body formed in substantially a shape of a flat plate between the plurality of light emitting diodes for guiding the light emitted from the light emitting diodes in a predetermined direction, the lens body being disposed in a state of extending over the disposition surface of each sealing resin, the lens body including a plurality of concave portions, each of the plurality of concave portions centered above each of the plurality of light emitting diodes, each the plurality of concave portions being surrounded by the convex portions raised above the lens body surface, wherein the lens body includes a plurality of lens parts for sending out the light emitted from the light emitting diodes, a plurality of light guiding parts for reflecting the light emitted from the light emitting diodes between surfaces of the light guiding parts, the plurality of lens parts and the plurality of light guiding parts of the lens body formed integrally with each other, the lens parts disposed over the respective disposition surfaces of the sealing resins, and a plurality of light emitting function parts for sending out the light reflected by the inside surfaces of the light guiding parts formed in one or more of the surfaces of the light guiding parts.

2. The light emitting device according to claim 1, wherein formation density of the light emitting function parts of the lens body becomes higher as distance from the lens parts is increased.

3. The light emitting device according to claim 1, wherein the light emitting function parts extend from a lower surface or an upper surface of the plurality of light guiding parts, the light emitting function parts are triangularly shaped.

4. The light emitting device according to claim 1, wherein the light emitting function parts extend from a lower surface of the plurality of light guiding parts, the light emitting function parts are hemisphere shaped or triangularly shaped.

5. The light emitting device according to claim 1, wherein an emission angle is an angle with respect to an optical axis of the light emitted from the lens body, wherein an emission intensity exhibits a minimum value at an emission angle of zero degrees and a maximum value of an emission angle of +0.75 degrees or −0.75 degrees.

6. A surface light source device comprising:

a light emitting device having a plurality of light emitting diodes for emitting light in a predetermined direction;

a plurality of sealing resins sealing the light emitting diodes and having a disposition surface; and a lens body formed in substantially a shape of a flat plate between the plurality of light emitting diodes for guiding the light emitted from the light emitting diodes in a predetermined direction, the lens body being disposed in a state of extending over the disposition surface of each sealing resin, the lens body including a plurality of concave portions, each of the plurality of concave portions centered above each of the plurality of light emitting diodes, each of the plurality of concave portions being surrounded by each of the convex portions of the lens body;

wherein the lens body includes a plurality of lens parts for sending out the light emitted from the light emitting diodes, a plurality of light guiding parts for reflecting the light emitted from the light emitting diodes between surfaces of the light guiding parts, the plurality of lens parts and the plurality of light guiding parts of the lens body formed integrally with each other, the lens parts disposed over the respective disposition surfaces of the sealing resins, and a plurality of light emitting function parts for sending out the light reflected by the inside surfaces of the light guiding parts formed in one or more of the surfaces of the light guiding parts.

7. The surface light source device according to claim 6, wherein formation density of the light emitting function parts of the lens body becomes higher as distance from the lens parts is increased.

8. The surface light source device according to claim 7, wherein the light emitting function parts are grains formed by microfabrication.

9. The surface light source device according to claim 7, wherein the light emitting function parts extend from a lower surface of the plurality of light guiding parts.

10. The surface light source device according to claim 9, wherein the light emitting function parts are hemisphere shaped or triangularly shaped.

11. The surface light source device according to claim 7, wherein the light emitting function parts extend from an upper surface of the plurality of light guiding parts, the light emitting function parts are triangularly shaped.

12. The surface light source device according to claim 7, wherein an emission angle is an angle with respect to an optical axis of the light emitted from the lens body, wherein an emission intensity exhibits a minimum value at an emission angle of zero degrees and a maximum value of an emission angle of +0.75 degrees or −0.75 degrees.

13. An image display device comprising:

a display panel for displaying an image; and a surface light source device having a light emitting device for irradiating the display panel with light;

wherein the light emitting device includes a plurality of light emitting diodes for emitting light in a predetermined direction, a plurality of sealing resins sealing the light emitting diodes and having a disposition surface, and a lens body formed in substantially a shape of a flat plate between the plurality of light emitting diodes for guiding the light emitted from the light emitting diodes in a predetermined direction, the lens body being disposed in a state of extending over the disposition surface of each sealing resin, the lens body including a plurality of concave portions centered, each of the plurality of concave portions above each of the plurality of light emitting diodes, each of the plurality of concave portions being surrounded by each of the convex portions of the lens body, and wherein the lens body includes a plurality of lens parts for sending out the light emitted from the light emitting diodes, a plurality of light guiding parts for reflecting the light emitted from the light emitting diodes between surfaces of the light guiding parts, the plurality of lens parts and the plurality of light guiding parts of the lens body formed integrally with each other, the lens parts disposed over the respective disposition surfaces of the sealing resins, and a plurality of light emitting function parts for sending out the light reflected by the inside surfaces of the light guiding parts formed in one or more of the surfaces of the light guiding parts.

14. The image display device according to claim 13, wherein formation density of the light emitting function parts of the lens body becomes higher as distance from the lens parts is increased.

15. The image display device according to claim 13, wherein the light emitting function parts extend from a lower surface of the plurality of light guiding parts.

16. The image display device according to claim 15, wherein the light emitting function parts are hemisphere shaped or triangularly shaped.

17. The image display device according to claim 13, wherein the light emitting function parts extend from a lower surface or an upper surface of the plurality of light guiding parts, the light emitting function parts are triangularly shaped.

18. The image display device according to claim 16, wherein an emission angle is an angle with respect to an optical axis of the light emitted from the lens body, wherein an emission intensity exhibits a minimum value at an emission angle of zero degrees and a maximum value of an emission angle of +0.75 degrees or −0.75 degrees.

* * * * *